United States Patent
Jiang et al.

(10) Patent No.: US 6,931,060 B1
(45) Date of Patent: Aug. 16, 2005

(54) VIDEO PROCESSING OF A QUANTIZED BASE LAYER AND ONE OR MORE ENHANCEMENT LAYERS

(75) Inventors: Hong Jiang, El Dorado Hills, CA (US); Weiping Li, Palo Alto, CA (US)

(73) Assignees: Intel Corporation, Santa Clara, CA (US); Optivision, Inc., Palo Alto, CA (US)

( * ) Notice: Subject to any disclaimer, the term of this patent is extended or adjusted under 35 U.S.C. 154(b) by 0 days.

(21) Appl. No.: 09/539,638

(22) Filed: Mar. 30, 2000

Related U.S. Application Data

(60) Provisional application No. 60/169,469, filed on Dec. 7, 1999.

(51) Int. Cl.⁷ ................................................. H04N 7/12
(52) U.S. Cl. ................................................. 375/240.03
(58) Field of Search ....................... 375/240.01–240.08, 375/240.1, 240.18, 240.2, 240.23–240.27; 382/232–235, 239, 244, 246, 248, 250, 251; H04N 7/12

(56) References Cited

U.S. PATENT DOCUMENTS 5,818,531 A * 10/1998 Yamaguchi et al. ...... 375/240.2
6,317,462 B1 * 11/2001 Boyce .................... 375/240.27

OTHER PUBLICATIONS

Steinmetz and Nahrstedt, Chap. 6, 4.2 Video Compression (http://www.cs.sfu.ca/undergrad/CourseMaterials/CMPT479/material/notes/Chap4 –printed Aug. 30, 2000).

Information Technology –Generic Coding of Audio–Visual Objects: Visual ISO/IEC 14496–2/Amd X; ISO/IECJTC1/SC29/WG11;N2815; Vancouver, Jul. 1999 (Working draft 1.0).

FGS Verification Model; ISO/IEC JTC1/SC29/WG11;N2816; Vancouver, Jul. 1999 (Version 1.0).

Information Technology –Generic Coding of Audio–Visual Objects: Visual ISO/IEC 14496–2/Amd X; ISO/IEC JTC1/SC29/WG11;N2925; Melbourne, Oct. 1999 (Working draft 2.0).

FGS Verification Model; ISO/IEC JTC1/SC29/WG11; N2926; Melbourne, Oct. 19999 (Version 2.0).

* cited by examiner

*Primary Examiner*—Young Lee
(74) *Attorney, Agent, or Firm*—Fish & Richardson P.C.

(57) ABSTRACT

In an encoding process, video data are represented as a bitstream of a quantized base layer and one or more enhancement layers, which capture the difference between a quantized base video picture and an original unquantized input video picture. Due to bandwidth constraints on a communication channel, it may be unfeasible to transmit all enhancement layers. During the encoding process, the enhancement layer data may be adjusted to give transmission priority to information in the enhancement layers that is visually important. Following transmission, the adjustment may be undone during the decoding process.

23 Claims, 5 Drawing Sheets

VIDEO PROCESSING OF A QUANTIZED BASE LAYER AND ONE OR MORE ENHANCEMENT LAYERS

RELATED APPLICATIONS

This application claims priority from U.S. Provisional Application Ser. No. 60/169,469, filed Dec. 7, 1999.

BACKGROUND

This invention relates to video processing.

Video is principally a series of still pictures, one shown after another in rapid succession, to give a viewer the illusion of motion. In many computer-based and network-based applications, video plays important roles. Before it can be transmitted over a communication channel, video may need to be converted, or "encoded," into a digital form. In digital form, the video data is made up of a series of bits called a "bitstream." Once encoded as a bitstream, video data may be transmitted along a digital communication channel. When the bitstream arrives at the receiving location, the video data are "decoded," that is, converted back to a form in which the video may be viewed. Due to bandwidth constraints of communication channels, video data are often "compressed" prior to transmission on a communication channel. Compression may result in a loss of picture quality at the receiving end.

A compression technique that partially compensates for loss of quality involves separating the video data into two bodies of data prior to transmission: a "base layer" and one or more "enhancement layers." The base layer includes a rough version of the video sequence and may be transmitted using comparatively little bandwidth. Each enhancement layer also requires little bandwidth, and one or more enhancement layers may be transmitted at the same time as the base layer. At the receiving end, the base layer may be recombined with the enhancement layers during the decoding process. The enhancement layers provide correction to the base layer, consequently improving the quality of the output video. Transmitting more enhancement layers produces better output video, but requires more bandwidth. A bandwidth is often measured in units of bits per second (bps) or bytes per second (Bps). A communication channel provided by an ordinary telephone line, for example, may have a bandwidth of 28.8 kbps, or 28,800 bits per second. In some circumstances, bandwidth restrictions may prevent transmitting the full number of enhancement layers.

Enhancement layers may contain information to enhance the color of a region of a picture and to enhance the detail of the region of a picture.

DETAILED DESCRIPTION

One implementation of the invention is to distribute video data in a network in which different communication paths are characterized by different bandwidths.

Figure 1:
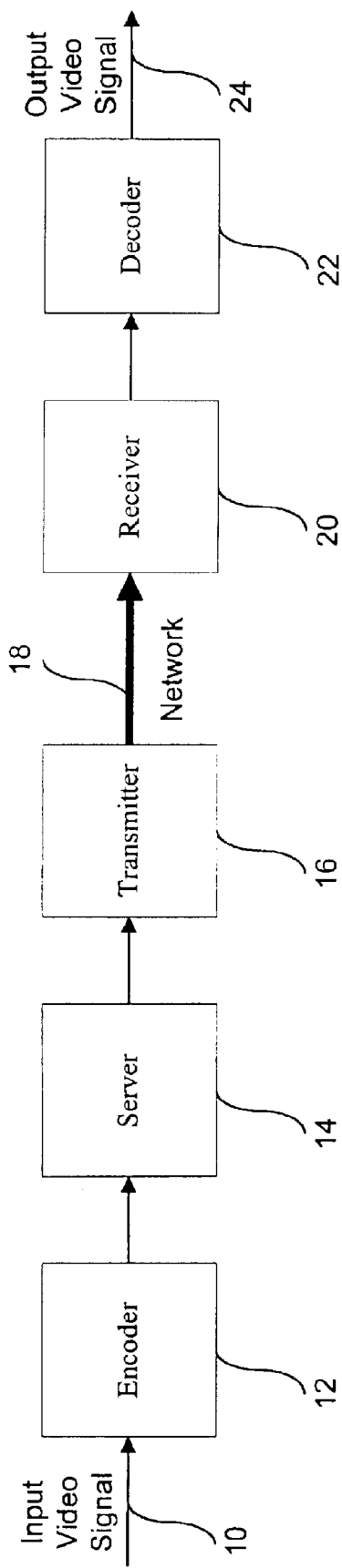
FIG. 1 is a functional block diagram showing a path of a video signal.

FIG. 1 is a block diagram showing a general path taken by video data being distributed over a network. The input video signal 10 is fed into an encoder 12, which converts the signal 10 into video data, in the form of a machine-readable series of bits, or bitstream. The video data are then stored on a server 14, pending a request for the video data. When the server 14 receives a request for the video data, it sends the data to a transmitter 16, which transmits the data along a communication channel 18 on the network. A receiver 20 receives the data and sends the data as a bitstream to a decoder 22. The decoder 22 converts the received bitstream into an output video signal 24, which may then be viewed.

The encoding done in encoder 12 may involve lossy compression techniques such as MPEG-2 or MPEG-4, version 1 or version 2, resulting in a base layer, that is, a body of data sufficient to permit generation of a viewable video sequence of lesser quality than is represented by the source video sequence. The base layer comprises a low-bandwidth version of the video sequence. If it were to be decoded and viewed, the base layer would be perceived as an inferior version of the original video. (MPEG is short for Motion Picture Experts Group, and MPEG-2 and MPEG-4 represent digital video compression standards and file formats developed by the group.)

One lossy compression technique employed by MPEG is to encode most of the pictures in the video sequence as changes from one picture to the next, rather than as the picture data itself. This technique results in a considerable saving of bandwidth.

Other bodies of data, called enhancement layers, may capture the difference between a quantized base video picture and an original unquantized input video picture. Enhancement layers enhance the quality of the viewable video sequence generated from the base layer. Combining the base layer with a single enhancement layer at the receiving end produces a correction to the video data and an improved output video. Combining an additional enhancement layer provides additional correction and additional improvement. Combining the base layer with all enhancement layers at the receiving end will result in a video output of quality nearly equal to the original input video.

An enhancement layer corresponding to a picture may contain a correction to the change from one picture to the next, or it may contain a correction to the picture data itself. An enhancement layer generally corresponds to a base layer. If a picture in the base layer is encoded as changes from one picture to the next, then the enhancement layers corresponding to that picture generally contain a correction to the change from one picture to the next.

Typically each enhancement layer is one "bit slice" of the difference data. In such an arrangement, each enhancement layer for each picture would have a series of bits. The enhancement layers are ordered in such a way that the first enhancement layer would contain the most significant bits, the second enhancement layer would contain the next most significant bits, and so on. This means that the most significant correction would be made by the first enhancement layer. Combining more enhancement layers would continue to improve the output quality. In this way, the quality of the output video can be "scaled" by combining different numbers of enhancement layers with the base layer.

In some circumstances, such as those where the bandwidth of the communication channel will not support all enhancement layers, fewer than the full number of enhancement layers may be available on the receiving end. In such circumstances, one way to improve output video impact may be to enhance different regions of a picture unequally.

Figure 2:
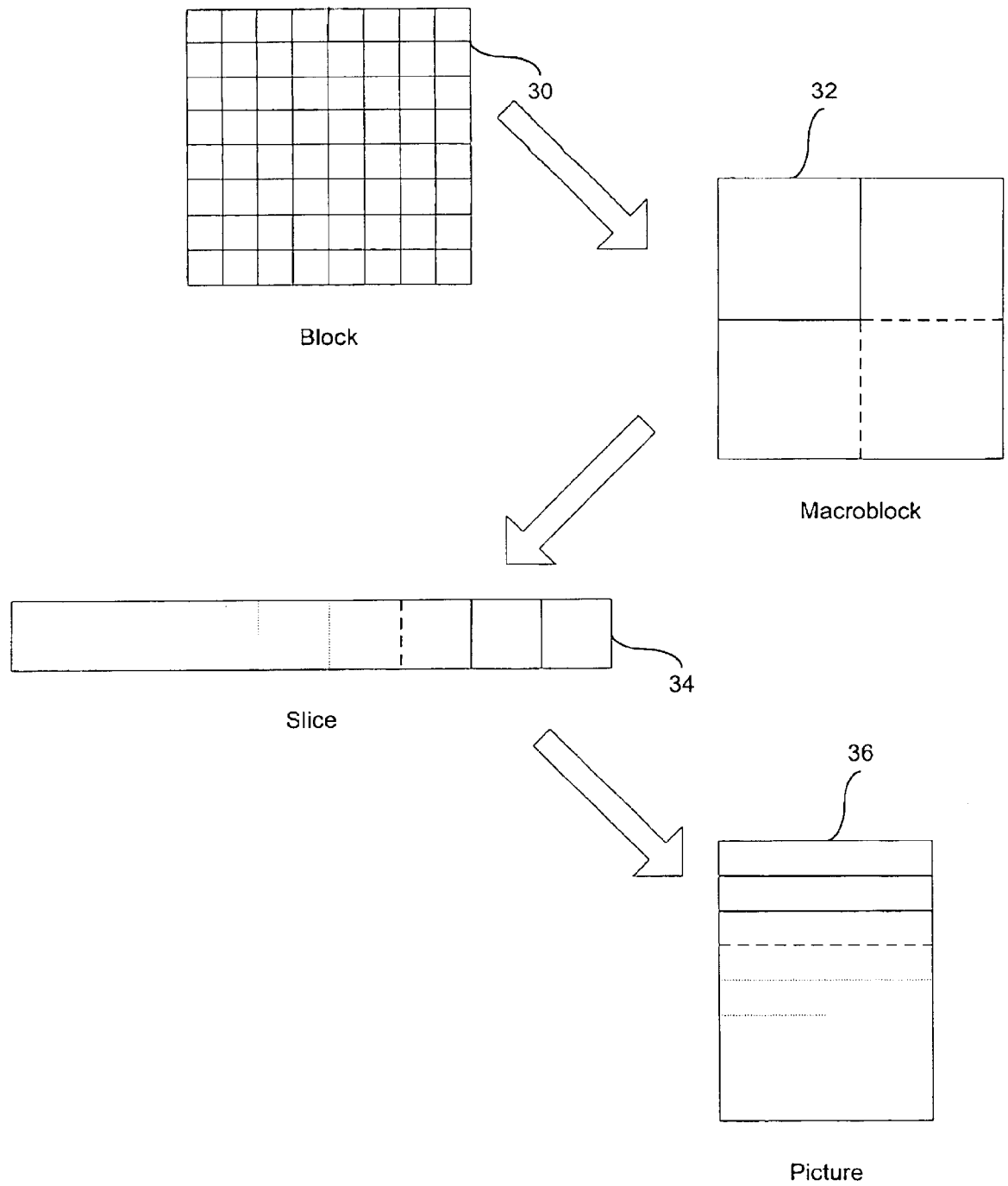
FIG. 2 is a hierarchical representation of units making up a typical picture.

FIG. 2 shows some units that form a picture. In general, a picture is made up of picture elements, or pixels. An 8-by-8 square of pixels forms a block 30, and a 2-by-2 square of blocks forms a macroblock 32. Macroblocks placed side-by-side may form a slice 34 of picture data. A slice is a horizontal strip of the picture, and a sequence of slices may compose a picture 36. The quality of an output video may be improved by selective enhancement of some sub-units of the picture, such as blocks.

In general, when an average person looks at a still picture, the person's perception is principally global. This means that a person tends to focus upon the overall appearance of the picture, rather than its details. A person is more likely to perceive something wrong with a picture if it affects the picture as a whole. For example, a person is more likely to notice that the color changes are rough and less likely to notice that some of the detail of the picture is lacking. This tendency of humans to focus globally applies to videos as well.

An important feature of the invention is that it provides more enhancement to the global aspects of each picture in a video sequence, and less enhancement to the details. The result is a more aesthetically pleasing output video.

During the encoding process, the picture data may undergo a transformation process as a part of data compression. A widely-used transform is the discrete cosine transform (DCT). The DCT is a linear transform similar to the discrete Fourier transform in that the transformed data are ordered by frequency and are weighted by coefficients. An 8-by-8 block of pixels undergoing a DCT will generate an 8-by-8 matrix of coefficients. The DCT may operate on groups of pixels of other sizes as well, such as a 16-by-16 block, but the transform of an 8-by-8 block is an exemplary application of the DCT.

In general, the DCT treats each 8-by-8 block of pixels as a discrete signal. The DCT creates an 8-by-8 matrix of coefficients representing the horizontal frequency and the vertical frequency of the pixels. Generally speaking, frequency relates to how often a quantity changes. Zero frequency means no change at all.

To illustrate, a block of pixels consisting only of an image of a horizontal black stripe on a field of white has zero horizontal frequency, because the image does not change in the horizontal direction. That same image, however, has a non-zero vertical frequency, because in the vertical direction the colors change from white to black to white.

The coefficients weight how heavily the lower- and higher-frequency components are represented in the block. The magnitude of the coefficients may be related to color and brightness.

Figure 3:
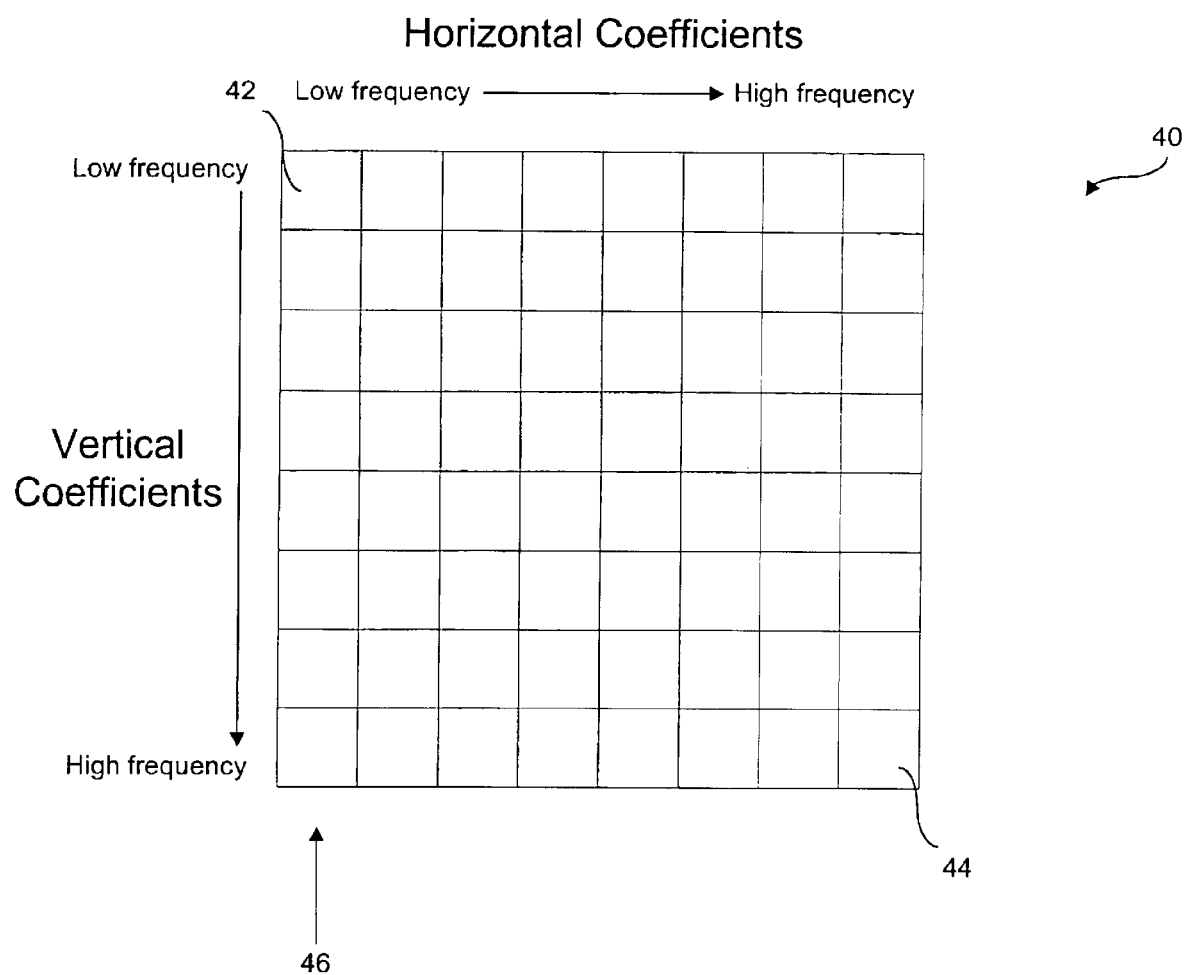
FIG. 3 is a diagram depicting organization of DCT coefficients.

FIG. 3 illustrates how a DCT arranges the coefficients in an 8-by-8 matrix 40. The horizontal coefficients are ordered with the lower-frequency terms on the left and the higher-frequency terms on the right. The vertical coefficients are ordered with the lower-frequency terms on the top and the higher-frequency terms on the bottom. The coefficient stored in the uppermost leftmost cell 42 represents the portion of the 8-by-8 block of pixels that has zero horizontal frequency and zero vertical frequency, the portion that is constant throughout the block. This coefficient, which is often called the "DC coefficient," may represent the average color and brightness of the entire block of pixels. The coefficient stored in the lowermost rightmost cell 44 represents the highest amount of horizontal and vertical change within the block.

Using the example of a block of pixels consisting only of an image of a horizontal black stripe on a field of white, the DCT would produce a matrix of coefficients, of which most would be zero. Because the image has zero horizontal frequency, only the leftmost column 46 could have any non-zero coefficients.

In a block of pixels, more detail generally means there is more change within the block. More change means there will be more higher-frequency components when the block undergoes a DCT. In this way, detail within a block is generally related to the DCT coefficients for that block.

One aspect of the invention is to de-emphasize the detail by generally de-emphasizing the higher-frequency components produced by the DCT. The higher-frequency components tend to be visually insignificant. Another aspect of the invention is generally to emphasize the lower-frequency components produced by the DCT, which tend to be visually important and affect the overall appearance of the pictures.

Figure 4:
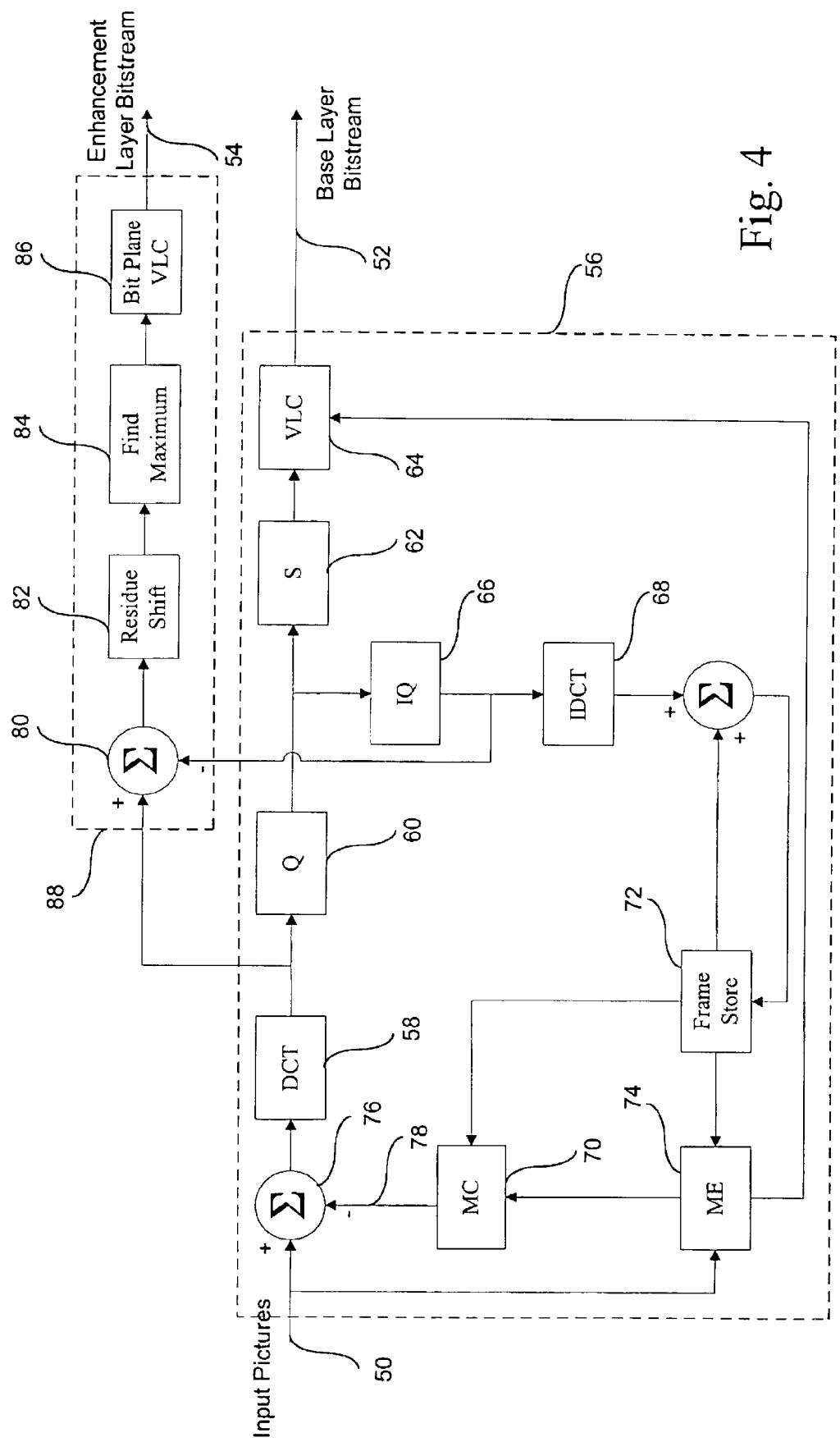
FIG. 4 is a block diagram showing video encoding and compression according to an implementation of the invention.

FIG. 4 demonstrates encoding and compression of a series of input pictures 50, resulting in a base layer bitstream of the video data 52 plus a bitstream of one or more enhancement layers 54. The base layer bitstream 52 and enhanced layer bitstream 54 may be combined into a single output bitstream (not shown) by a multiplexer (not shown), prior to storage on a server or transmission along a communication channel.

The base layer may be created by standard video encoding and compression techniques 56. The encoding and compression techniques 56 shown in FIG. 4 are illustrative but are not the only way to achieve encoding and compression. Encoding and compression may employ a DCT 58, quantization 60, scanning 62 and variable length coding 64. FIG. 4 also includes techniques for encoding the changes between individual pictures, which include inverse quantization 66, an inverse discrete cosine transform (IDCT) 68, motion compensation 70, frame store 72, motion estimation 74, and subtraction 76 of an earlier picture 78 from the input picture stream 50 to isolate the changes from one picture to the next.

Most data are lost from the base layer during quantization 60. Not all blocks are quantized in the same way. A block with more detail, and thus more higher-frequency components, results in an 8-by-8 matrix with more non-zero coefficients. The more non-zero coefficients in the matrix, the more difficult it is for variable length coding 64 to compress the data. Consequently, a typical quantizer 60 may set the coefficients of some higher-frequency components to zero, allowing the base layer to be more easily and more consistently compressed.

The effect of base layer quantization is that encoding blocks with more detail will result in more data loss from the base layer, while encoding blocks with less detail is less lossy.

FIG. 4 shows a subtraction 80 that results in the creation of enhancement layers, which are also called "residue" or "residual data." The enhancement layers contain the various bits of the difference between the quantized base video and the unquantized input video. In FIG. 4, the enhancement layers corresponding to each picture represent enhancements to the changes between individual pictures, as well as enhancements to the individual pictures themselves.

Because the quantization of the base layer may have varied from block to block, the amount of data lost to the base layer may also have varied from block to block. As a result, the subtraction 80 causes the enhancement layers corresponding to those blocks to encompass large correction factors, to make up for the data lost during quantization 60.

In cases where bandwidth is limited and only a fraction of the enhancement data may be transmitted on the communication channel, the layers with the most significant bits would be transmitted. Unfortunately, many of the most significant bits in the enhancement layer may relate to restoring the higher-frequency, or visually insignificant, components of the most detailed blocks. Corrections to the details may not significantly improve picture quality.

The invention provides a way to emphasize the visually important components in the enhancement layer and de-emphasize the visually insignificant components. By emphasizing or more heavily weighting the visually important components, the most significant bits in the enhancement layer will relate to overall picture improvement. The purpose of the emphasis is not to overcorrect or undercorrect the blocks during the decoding process, but rather to give visually important components in the enhancement layer a higher transmission priority than visually insignificant components. In this way, the available bandwidth may be used to enhance the overall picture quality, rather than the details of the blocks.

FIG. 4 illustrates processes that may be employed to achieve this result. The enhancement data undergo a residue shift process 82 to emphasize the visually important components in the enhancement layer and de-emphasize the visually insignificant components. There are many ways to accomplish this result. One way is to use an 8-by-8 matrix, called a "frequency weighting matrix." A frequency weighting matrix may contain factors representing the relative amount of emphasis to be provided for different frequency components. Factors in the frequency weighting matrix may consist of, for example, shifting factors that specify the number of left-shifts for visually important bits. A single left-shift of bits is equivalent to multiplying by 2, a second left-shift is equivalent to multiplying by 4, a third left-shift is equivalent to multiplying by 8, and so on. The residue shifter could make bits more significant by shifting them to the left.

Instead of containing shifting factors, the frequency weighting matrix may contain a selection of multiplying factors, with high multiplying factors corresponding to visually important terms and low multiplying factors corresponding to visually insignificant terms. The residue shifter could make bits more or less significant by multiplying the number represented by those bits by some factor.

The residue shifter need not apply the same shifting or multiplication factors to all blocks making up the picture. The residue shifter may, for example, apply one frequency weighting matrix to blocks that lost more data during quantization, and a different frequency weighting matrix to blocks that lost less data during quantization. Alternatively, the residue shifter may apply the same frequency weighting matrix to all blocks, but adjust the factors within the matrix up or down, depending upon the degree of data lost during quantization.

In some kinds of encoders, unlike the encoder depicted in FIG. 4, a block of video data may be broken into luminance data and chrominance data. In such a case, the residue shifter may apply one frequency weighting matrix to the luminance data and a different frequency weighting matrix to the chrominance data.

Still a further way to emphasize the visually important components in the enhancement layer and de-emphasize the visually insignificant components may be to apply a formula to the blocks of enhancement data, without the need for a frequency weighting matrix. Alternatively, the formula may be used to generate a suitable frequency weighting matrix.

After processing the enhancement data through a residue shifter 82, it may be necessary to find which bits of the residue shifted data are most significant. A processor to find the new maximum 84 may perform this function, and may arrange the enhancement layer data into individual enhancement layers, or "bit planes," the bit plane containing the most significant bits of enhancement data, the second bit plane containing the next most significant bits of enhancement data, and so on. The bit planes may then be processed into an enhancement layer bitstream 54 by variable length coder 86.

The base layer bitstream 52 and the enhancement layer bitstream 54 may be stored on a server (not shown) awaiting a client's request for the video sequence or broadcast to the network.

Figure 5:
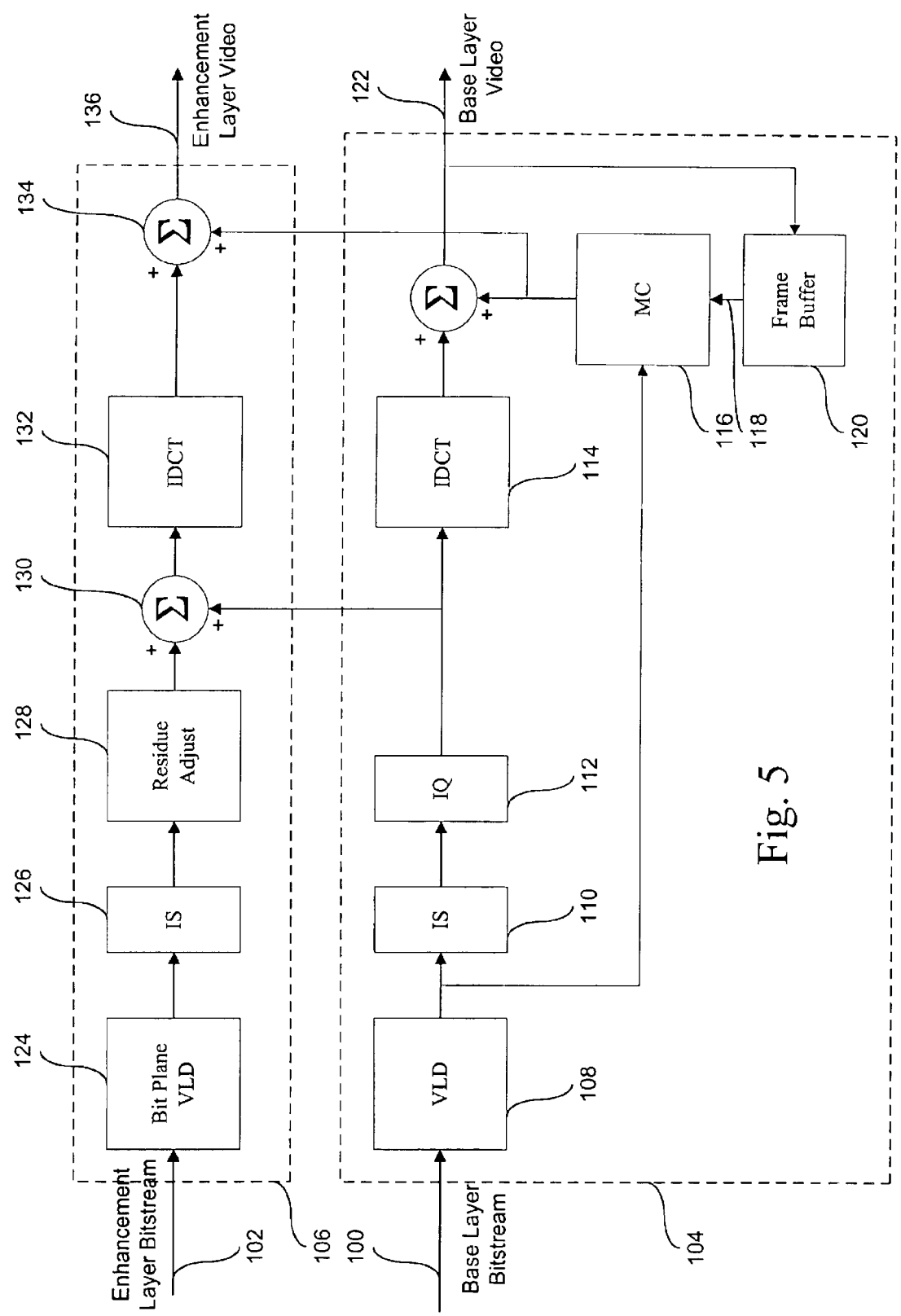
FIG. 5 is a block diagram showing video decoding in accordance with an implementation of the invention.

FIG. 5 demonstrates a method for decoding and recovery of video data that has been transmitted by a server over a communication channel and received by a client. At the receiving end, the input to the decoder includes a bitstream of video data (not shown), which may be separated into a bitstream of base layer data 100 and a bitstream of enhancement layer data 102. A demultiplexer (not shown) may be used to separate the bitstreams.

The base layer and the enhancement layers may be subjected to different decoding processes, or "pipelines" 104, 106. Just as the encoding of base and enhancement layers may not have involved identical steps, there may be some differences in the decoding processes as well.

In the base layer decoding pipeline 104, the base layer may undergo variable length decoding 108, an inverse scan 110, an inverse quantization 112, and an IDCT 114. The variable length decoding 108, inverse scan 110, inverse quantization 112 and IDCT 114 operations essentially undo the, variable length coding 64, scanning 62, quantization 60 and DCT 58 operations performed during encoding shown in FIG. 4. Decoded base layer data may then be processed in a motion compensator 116, which may reconstruct individual pictures based upon the changes from one picture to the next. Data from a previous, or "reference" picture 118 may be stored in a temporary memory unit called a "frame buffer" 120 and may be used as a reference. Decoded data from the IDCT 114 will be used by the motion compensator 116 to determine how the next picture in the sequence changes from the previous picture. The output of the base layer pipeline 104 is base layer video data 122. The decoding techniques shown in FIG. 5 are illustrative but are not the only way to achieve decoding.

The decoding pipeline for enhancement layers 106 is different from the decoding pipeline for the base layer 104. Following a variable length decoding process 124, and an inverse scan process 126, the enhancement layer data may undergo a residue adjust process 128, which undoes the residue shift 82 of FIG. 4. Without residue adjust 128, the enhancement layers will overcorrect the base layer.

The enhancement layer data from the residue adjust 128 may be summed 130 with the base layer data from inverse quantization 112, prior to an IDCT 132. The output from the IDCT 132 represents a correction which may be summed 134 with the data from a previous picture. The output from the summing operation 134 may represent the enhanced layer of video data 136. When the enhanced layer of video undergoes recombination (not shown) with the base layer 122, the result may be a picture in the video sequence ready for viewing. Typically pictures ready for viewing are stored in the frame buffer 120, which can provide a steady stream of video picture data to a viewer (not shown).

The decoder shown in FIG. 5 is exemplary. Some of the operations depicted in FIG. 5 are linear, and may appear in a different order. In addition, decoding may consist of additional operations that do not appear in FIG. 5.

Other embodiments are within the scope of the following claims.

What is claimed is:

1. A method comprising:

generating data associated with a source video sequence, at least a first body of data being sufficient to permit generation of a first viewable video sequence of lesser quality than is represented by the source video sequence, and at least a second body of data being sufficient to enhance the quality of the first viewable video sequence generated from the first body of data, and generating a frequency weighting matrix, having factors for different parts of the image which establish transmission priority to units of the second body of data, wherein different parts of the matrix have different weighting for different amounts of detail within the units to provide priority to the units which have more visual impact.

2. The method of claim 1, further comprising determining a transmission priority according to an amount of data lost in the first body of data during the first body's generation.

3. The method of claim 1, further comprising, following reception of the second body of data, undoing the operation that adjusted the second body of data.

4. A method as in claim 1, when said frequency weighting matrix has factors which represent an amount of shift for different values within the matrix.

5. A method as in claim 4, wherein said shifting makes the bits more significant or least significant.

6. A method as in claim 1, wherein said frequency weighting matrix includes multiplying factors which represent a significance of different parts of the image.

7. A method as in claim 1, wherein said frequency matrix supplies different factors for different portions of the image.

8. A method as in claim 7, wherein said factors are based on an amount of data which was lost during quantization.

9. A method as in claim 7, wherein said factors in said matrix have different factors for luminance data and chrominance data.

10. An article comprising a computer-readable medium which stores computer-executable instructions, the instructions causing a computer to:

generate data associated with a source video sequence, at least a first body of data being sufficient to permit generation of a viewable video sequence of lesser quality than is represented by the source video sequence, and at least a second body of data being sufficient to enhance the quality of the viewable video sequence generated from the first body of data, and generate a frequency weighting matrix, having factors for different parts of the image which establish transmission priority to different units of the second body of data, wherein different parts of the matrix have different weighting for different amounts of detail within the units to provide priority to the units which have more visual impact.

11. The article as in claim 10, wherein said frequency weighting matrix has factors which represent an amount of shift for different values within the matrix.

12. An article as in claim 11, wherein said shifting makes the bits more significant or least significant.

13. An article as in claim 10, wherein said frequency weighting matrix includes multiplying factors which represent a significance of different parts of the image.

14. An article as in claim 10, wherein said frequency matrix supplies different factors for different portions of the image.

15. An article as in claim 14, wherein said factors are based on an amount of data which was lost during quantization.

16. An article as in claim 14, wherein said factors in said matrix have different factors for luminance data and chrominance data.

17. A system for encoding and decoding a video sequence of pictures, comprising:

an encoder capable of generating a first body of data sufficient to permit generation of a viewable video sequence of lesser quality than is represented by the video sequence, generating a second body of data being sufficient to enhance the quality of the viewable video sequence generated from the first body of data, storing and accessing a frequency weighting matrix, having factors for different parts of the image which establish transmission priority to different units of the second body of data, according to the amount of detail within the units, and a decoder capable of undoing the adjustment made by the encoder.

18. The system of claim 17, wherein the decoder is further capable of performing decoding operations on the first body of data, including variable length decoding, inverse quantization, inverse scanning, inverse discrete cosine transformation or motion compensation.

19. A system as in claim 17, wherein said shifting makes the bite more significant or least significant.

20. A system as in claim 17, wherein said frequency weighting matrix includes multiplying factors which represent a significance of different parts of the image.

21. A system article as in claim 17, wherein said frequency matrix supplies different factors for different portions of the image.

22. A system as in claim 21, wherein said factors are based on an amount of data which was lost during quantization.

23. A system as in claim 17, wherein said factors in said matrix have different factors for luminance data and chrominance data.

* * * * *